April 7, 1953 — E. M. KELLY — 2,633,863
LIQUID LEVEL CONTROL
Filed March 18, 1950 — 2 SHEETS—SHEET 1

INVENTOR.
EARL M. KELLY,
BY James B. Christie
ATTORNEY.

April 7, 1953 E. M. KELLY 2,633,863
LIQUID LEVEL CONTROL
Filed March 18, 1950 2 SHEETS—SHEET 2
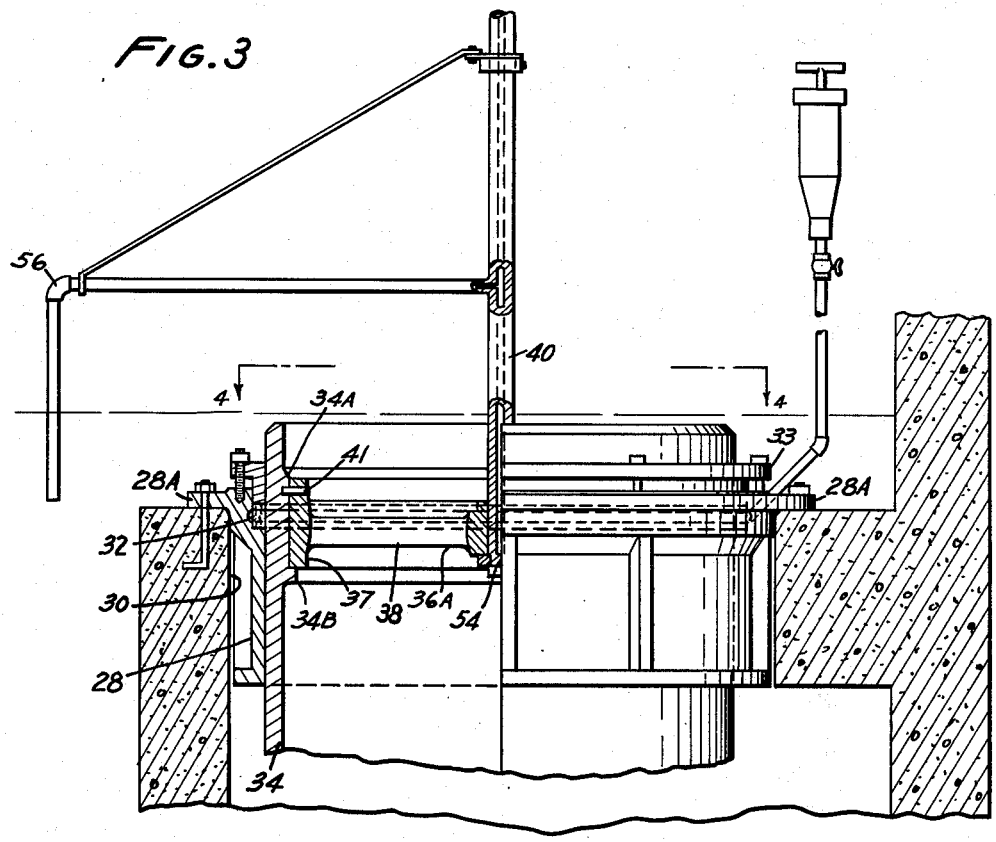
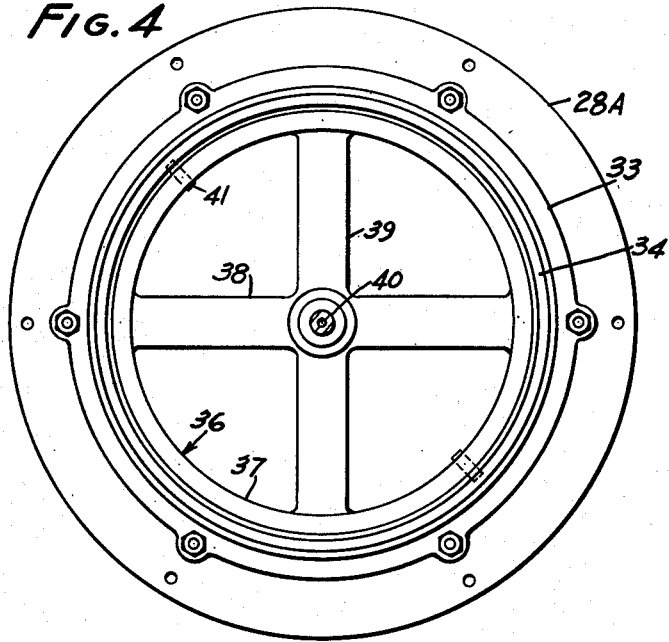
INVENTOR.
EARL M. KELLY,
BY James B. Christie
ATTORNEY.

Patented Apr. 7, 1953

2,633,863

UNITED STATES PATENT OFFICE 2,633,863

LIQUID LEVEL CONTROL

Earl M. Kelly, Millbrae, Calif., assignor to Process Engineers Incorporated, San Francisco, Calif., a corporation of California Application March 18, 1950, Serial No. 155,616

5 Claims. (Cl. 137—395)

This invention relates to a telescopic valve or a variable level weir for use in scum or float removal operations and as a flow diversion means.

A particular application of the invention is in sewage treatment installations wherein undesirable accumulation of scum and floatable materials is always a problem. In such an installation, raw sewage enters the sewage disposal plant through a number of lines and is discharged from the several lines into a so-called "wet well" which functions as a large surge tank. The sewage is generally removed from the wet well for treatment through a large opening located at or near the bottom of the well. Withdrawal of the sewage from the bottom of the well only has been found to result in an excessive accumulation of scum and floating solids on the surface of the liquid in the well. Such accumulation is undesirable because of the consequent obnoxious odors which result. A conventional overflow weir, however, does not suffice for the removal of this material by reason of the fact that the liquid level in the wet well is constantly changing and to a very appreciable extent. As a result, overflow into a weir may be excessive at one time and negligible or nil at another.

I have now developed an automatic variable level float remover in the form of a telescopic weir or valve which is equally suited to the removal of scum, etc. from a sewage plant wet well, for removing floating material from a rather inaccessible pump pit, or for removing a relatively constant amount of liquid from a liquid body in which the liquid level varies continuously or intermittently. In addition to providing means for eliminating scum accumulation in sewage plants, the device of the invention finds use in the chemical and metallurgical industries for removing surface accumulation from floatation cells, digesters etc.

In accordance with the invention I provide apparatus for withdrawing a substantially constant volume of liquid from the surface of a body of liquid the level of which is subject to variation, which comprises an enclosed outlet well disposed within the body of liquid, an elongated open ended tubular member extending into the well and slidable therein in the direction of its longitudinal axis. The tubular member is sealed through a wall of the well and projects upwardly therefrom in the direction of the surface of the liquid so that the only liquid that can enter the well from the liquid body is that which flows through the tubular member from its open upper end. An elongated hanger is affixed at one end to the upper end of the tubular member and extends above the surface of the liquid body. Support means are mounted above the body of the liquid to slidably support the hanger and include means for raising and lowering the hanger to maintain the upper end of the tubular member at a substantially uniform and predetermined distance below the surface of the liquid.

In a preferred embodiment of the invention automatic means are included for varying the level of the open upper end of the tubular member responsive to variations in the level of the surface of the liquid body in the direction and to the same degree as the variation in liquid level. The automatic means takes the form of a motor operative above the body of liquid to raise and lower the hanger responsive to the variation in a preselected function brought about by the change in liquid level. The motor may be of the induction type operative responsive to an electrical signal applied across one of its coils and originating as a result of the variation of the particular function chosen. For example a plurality of electrodes may be disposed with relation to the liquid to immediately detect any change in liquid level and to develop a signal responsive thereto which when applied to the motor will actuate the motor to vary the position of the hanger depending upon the direction of liquid level change. As another practical alternative a manometer may be mounted so as to be sensitive to such changes in liquid level as affecting the pressure within the manometer. In this instance pressure variation is converted into a corresponding electrical signal as by causing it to vary the capacitance of a capacitance bridge which will in turn develop a signal of appropriate polarity to be applied to the motor. By mounting the manometer, electrodes, or other sensing means directly on the hanger any differential between the surface of the liquid and the hanger position is sensed immediately and in turn the open upper end of the tubular member is continuously maintained at a uniform predetermined distance below the surface of the liquid.

The invention will be more clearly understood from the following detailed description thereof which for purposes of clarity is based on the use of the invention in sewage treatment as above described and in view of the accompanying drawing in which:

Fig. 3 is an enlarged partial sectional elevation taken on the line 2—2 of Fig. 1 showing the apparatus of the invention in detail; and Fig. 4 is a sectional plan view taken on the line 4—4 of Fig. 3.

Figure 1:
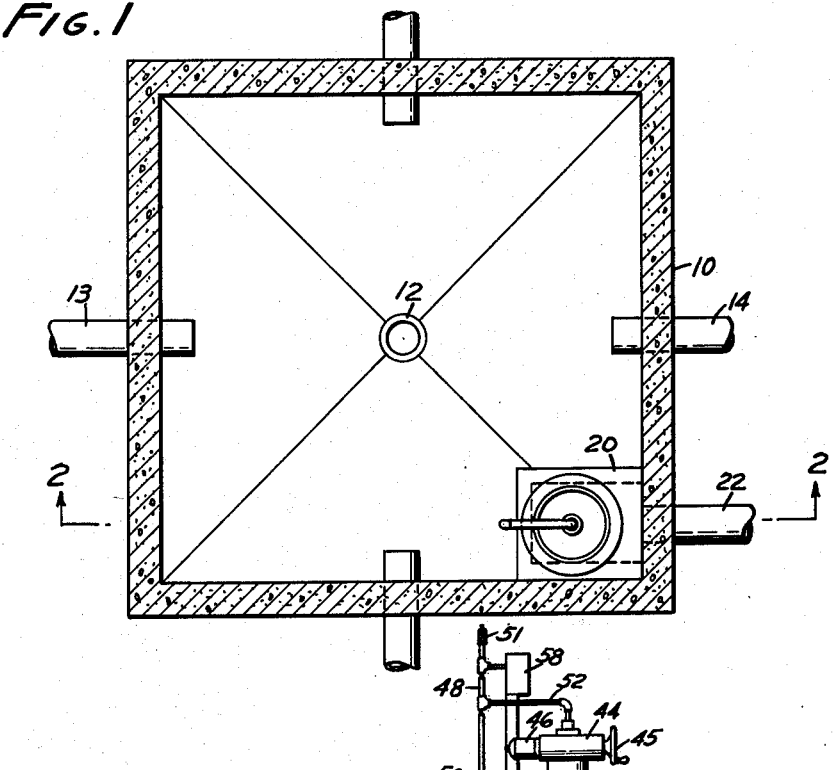
Fig. 1 is a horizontal section taken on the line 1—1 of Fig. 2 of a typical sewage wet well with the apparatus of the invention mounted therein.
Figure 2:
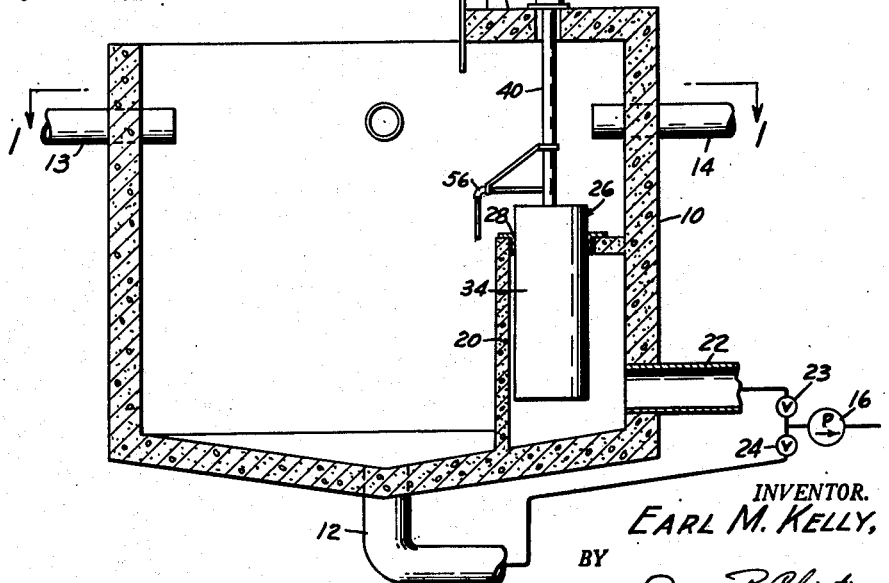
Fig. 2 is a sectional elevation of the wet well taken on the line 2—2 of Fig. 1.

In Figs. 1 and 2 of the drawing a typical sewage wet well is shown in plan and sectional elevation and comprises an enlarged tank 10 generally of concrete with substantially vertical sides and a sloping bottom opening into a discharge line 12. Raw sewage from a plurality of gathering systems is discharged into the wet well 10 through a number of inlet pipes 13, 14, etc. Raw sewage is withdrawn from the wet well for treatment, and at a uniform rate, through the discharge line 12 by means of a pump 16 (see Fig. 2).

In accordance with the invention a pump sump or well 20 is provided within the wet well of such dimensions and so located that the upper end thereof is substantially always below the surface of liquid in the wet well. For satisfactory operation the liquid level should be maintained above the sump at all times. A drain line 22 opens through a wall of the wet well into the pump sump 20. Conveniently the drain line 22 and the discharge line 12 are manifolded through valves 23, 24 respectively to the pump 16 (see Fig. 2) so that by appropriate manipulation of the valves and of the sewage flow into the sump any desired ratio can be established with regard to the withdrawal of sewage from the lines 22 and 12. If the apparatus of the invention is used as a flow diverter, a ratio is established by controlling the liquid flow into the sump and thus the rate of withdrawal therefrom in relation to the rate of withdrawal from additional outlets.

A variable level valve or weir is mounted in the wet well to control the rate of flow of sewage into the pump sump 20. The object of the variable level weir is to provide means for withdrawing a predetermined and relatively uniform amount of sewage from a point adjacent the surface of the body of sewage into the sump, and to maintain this withdrawal substantially uniform regardless of variation in the level of sewage in the wet well.

The valve itself can best be described with relation to Figs. 2, 3 and 4. Fig. 2 shows the entire valve assembly in elevation including the portions thereof residing within the liquid body and the support and control means mounted above the liquid body. Fig. 3 shows an enlarged sectional elevation of a portion of the valve and pump sump through which the valve is mounted and Fig. 4 is a sectional plan view taken on the line 4—4 of Fig. 3 showing the means of suspending the telescoping portion of the valve within the wet well. The valve comprises a tubular member 26 sealed through a cylindrical sleeve 28 mounted through the top wall of the pump sump 20. The sleeve 28 has an annular outwardly projecting flange 28A which overlies and is fastened to the sump wall around an enlarged opening 30 formed in this wall. An annular gasket 32 is mounted in the sleeve and is held in place by a packing gland 33. A cylindrical tube 34 of an outside diameter approximating the inside diameter of the sleeve 28 is slidably mounted through the sleeve with the gasket 32 forming a liquid seal between the two. The tube 34 is comparatively long, oftentimes as much as several feet in length, so that it can be raised and lowered to follow appreciable variations of the liquid level in the wet well. A spider 36 comprising an annular ring 37 and webs 38, 39 is affixed across the upper end of tube 34 with a plurality of pins 41 which pass through the ring 37 and into the wall of tube 34. An annular boss 34A is formed on the inner wall of the tube 34 adjacent the upper end thereof and terminating in an overhanging annular lip 34B. The annular ring 37 of the spider rests on the upper face of the lip 34B and is held in place by the pins 41 extending into the boss.

A pipe 40 is bolted to the spider at the central junction of the webs 38, 39 and supports the tube 34 from above. As shown in Fig. 2 the pipe 40 projects upwardly out of the wet well 10 and is connected to support means mounted above the wet well.

Pipe 40 extends through a stanchion 42 and through a lifting mechanism 44 including a hand wheel 45 and a motor 46. By means of the hand wheel or motor the pipe 40 may be raised or lowered to raise or lower the cylinder 34 to follow any variations in the liquid level in the wet well. Any of several common mechanical expedients may be used to link the pipe to the lifting means so that it can be raised or lowered by operation of the hand wheel or motor.

To obtain the maximum service from the telescopic valve, automatic control is desirable. Accordingly, the motor 46 is included in the lifting device 44 and by operation of the motor the lifting device may be caused to raise or lower the pipe 40 and hence tube 34. Many different means may be employed to actuate the motor responsive to the magnitude and direction of any change in liquid level in the wet well. One such means is illustrated in Fig. 2 and comprises a manometer 48 and controller 58. The manometer includes a flexible hose 50 connected at one end through a valve 51 to a source of air pressure (not shown) and at the other end to the pressure sensitive electrical control circuit 58 which is in turn connected to actuate motor 46. The air hose is connected intermediate the source and electrical control through a coupling leg 52 to the upper end of pipe 40. The lower end of pipe 40 is plugged at 54 (see Fig. 3) and a side leg 56 extends outwardly from the pipe 40 just above the tubular member 34 and downwardly so that the outer open end of the side leg 56 lies in a plane below the upper end of the tubular member 34. Air bled into hose 50 through valve 51 flows through pipe 40 and into and through leg 56. The side leg 56 is positioned to extend below the level of liquid in the wet well so long as the upper end of tube 34 is beneath the surface. So long as the liquid level above the outer end of side leg 56 remains non-variant, a constant back pressure will result. Under these conditions the electrical circuit 58 will not be triggered. If the liquid level in the wet well varies, the resultant change in back pressure in the air system will trigger the electrical circuit which will in turn actuate the motor in the proper direction and until the original pre-set pressure equilibrium is restored.

The arrangement is such that any increase in the level of the liquid in the wet well will increase the pressure within the manometer causing the control 58 to actuate the motor to raise the pipe 40. Conversely any lowering of the liquid level in the wet well will lower the pressure in the manometer causing the control 58 to actuate motor 46 to lower the pipe 40. In this manner, by setting the control 58 to be sensitive to any given variations in either direction in manometric pressure the upper open end of the tubular member 34 is maintained at all times at a given preselected distance below the surface of liquid in the wet well. This is so regardless of variations of the liquid level within the well. Pressure responsive electronic controllers are well known in the art, such instruments being presently obtainable commercially. These controllers may operate on any one of several principles. For example, a variation of the pressure within the manometer 48 in any direction from a preselected pressure may be used to vary the capacitance of a capacitor one element of which consists of a flexible diaphragm and this capacitor may in turn be included within a capacitance bridge so that variations in the capacitance of the sensing capacitor will result in an unbalance output signal from the bridge. The unbalance signal may in turn be amplified and applied to the motor 46 to operate the lifting device 44. Alternatively the controller may include an electromechanical transducer which develops an electrical signal in proportion to any change in manometer pressure. Other sensing means may be employed to which the controller may be made responsive. For example, the controller 58 may be connected to a series of staggered electrodes some of which are immersed in the liquid in the wet well replacing the manometer as illustrated. In such an event, the electrodes are arranged to sense a rise or fall in liquid level within the well and to transmit this intelligence to controller 58. An electrode follower system of this character is described and illustrated in considerable detail in my co-pending application Serial Number 125,226, filed November 3, 1949, jointly with Samuel R. Bousman. For maximum sensitivity with electrode followers it is desirable to dispose the electrodes in a stilling well wherein the temporal fluctuations in liquid level due to agitation of the surface of the body of liquid are eliminated. This stilling well may be constructed in the side of the wet well as for example just above the pump sump 20 and electrodes suspended in the liquid in the stilling well from the pipe 40. Any of these controllers are adapted to be pre-set so as to sense any variation from a predetermined norm. Thus by adjustment of the controller the weir may be maintained at any desired distance below the liquid surface. Alternatively, the relationship between the sensing means and the weir may be adjusted as for example by changing the vertical length of the side leg 56. In this manner the controller may be held sensitive to the same norm while the overflow weir is set at a different level with respect to the surface of the liquid.

Any means may be employed for sensing the variations in the liquid level within the wet well and transmitting this intelligence to the lifting device through appropriate electronic controllers and motors. Such means are available commercially and do not constitute part of this invention apart from their necessary relationship to the operation of the device of the invention.

For use in sewage disposal plants it is advisable that the telescopic weir of the invention be constructed of nickel clad steel, iconel clad steel or commercial bronze containing approximately 90% copper and 10% zinc. The reason for the selection of these particular materials is the appearance in most sewage of sulphurous acid due to the high concentration of hydrogen sulfide in the sewage. For other uses where such corrosive fluids are not encountered any materials can be used.

Particular emphasis has been placed in the use of the apparatus to remove floating materials from a body of liquid to eliminate undesired accumulation of such materials. However, it may also be used as a flow controller for withdrawing from a body of liquid a substantially constant volume of liquid unaffected by a change in the head of the liquid body. By way of example, if a telescopic weir two feet in diameter is maintained with the weir level one inch below the surface of the liquid, approximately 200 gallons per minute will overflow into the weir. This amount will not vary appreciably with a change in liquid level since the weir will follow the change, automatically maintaining the one inch differential. The pump by means of which the overflow is withdrawn from the pump sump may be set to operate continuously at this rate or intermittently at a greater rate, but in any event, the integrated liquid withdrawal from the liquid body is independent of variations in the liquid head.

I claim:

1. Apparatus for withdrawing a substantially constant volume of liquid from a body of liquid in which the liquid level is subject to variation comprising outlet means located below the surface of the liquid, a first tubular member slidably mounted in said outlet means and extending upward therefrom toward the surface, a second tube of smaller diameter than the first tube affixed to the first tube and extending above the surface of the liquid, means supporting the second tube above the surface of the liquid, means closing the lower end of the second tube, a tubular side arm extending outwardly from the second tube above the surface of the liquid and downwardly to terminate below the surface of the liquid, and means operable to raise and lower the second tube responsive to pressure changes induced in the side arm by variations in the liquid level.

2. Apparatus for withdrawing a substantially constant volume of liquid from a body of liquid in which the liquid level is subject to variation comprising outlet means located below the surface of the liquid, a first open ended tubular member slidably mounted in said outlet means and extending upward therefrom toward the surface, a second tube of smaller diameter than the first tube affixed to the first tube and extending above the surface of the liquid, means supporting the second tube above the surface of the liquid, means closing the lower end of the second tube, a tubular side arm extending outwardly from the second tube above the surface of the liquid and downwardly to terminate below the surface of the liquid, lifting means operable to raise and lower the second tube, pressure sensitive means operable to control said lifting means for connecting said pressure sensitive means and said side arm to a source of air under pressure whereby variations in liquid level cause said pressure sensitive means to operate said lifting means in a compensating direction.

3. In a sewage wet well having a plurality of inlets and a first outlet, the combination comprising an enclosed sump disposed in the wet well adjacent the bottom thereof, a second outlet opening into the sump, a first tubular member slidably mounted in said sump and extending upward therefrom, a second tube of smaller diameter than the first tube affixed to the first tube and extending upwardly from the wet well, means slidably supporting the second tube, means closing the lower end of the second tube, a tubular side arm opening into the second tube and extending outwardly and downwardly to a point below the upper end of the first tube, and means operable to raise and lower the second tube responsive to pressure changes induced in the side arm by variations in the liquid level.

4. Apparatus for withdrawing a substantially constant volume of liquid from the surface of a body of liquid in which the liquid level is subject to variation and including a first outlet opening into the bottom of the body, a wet well disposed within the body of liquid, an elongated open ended tubular member sealed through a wall of the well and slidable therein on its longitudinal axis in the direction of the surface of the liquid, a hanger affixed to the upper end of the tubular member and extending upwardly from the body of liquid, means slidably supporting the hanger, means depending from the hanger for detecting variations in the liquid level of the body of liquid, means operable to automatically raise and lower the hanger responsive to variations in the liquid level detected by said last named means, a second outlet opening into the wet well, a single pump, and manifold means connecting the first and second outlets to the single pump whereby a fixed ratio of liquid flow from the first and second outlets may be maintained.

5. Apparatus for withdrawing a substantially constant volume of liquid from the surface of a body of liquid in which the liquid level is subject to variation, comprising an encloesd outlet well disposed within the body of liquid, an elongated open ended tubular member sealed through the well and slidable therein on its longitudinal axis in the direction of the surface of the liquid, a hanger affixed at one end to the tubular member and extending above the surface of the liquid, support means mounted above the body of liquid and slidably supporting the hanger, control means for raising and lowering the hanger, and sensing means mounted beneath the surface of the liquid and sensitive to variations in liquid level and connected to operate said control means responsive to variations in liquid level to maintain the upper end of the tubular member a substantially uniform and predetermined distance below the surface of the liquid body.

EARL M. KELLY.

REFERENCES CITED

The following references are of record in the file of this patent:

UNITED STATES PATENTS

| Number | Name | Date |
|---|---|---|
| 418,984 | Parks | Jan. 7, 1890 |
| 706,526 | Carlisle | Aug. 12, 1902 |
| 2,140,059 | Simonsen | Dec. 13, 1938 |
| 2,409,768 | Lavett | Oct. 22, 1946 |
| 2,455,338 | Lind | Nov. 30, 1948 |